(No Model.)
G. H. JORDAN.
PLOW LINE.
No. 475,570. Patented May 24, 1892.
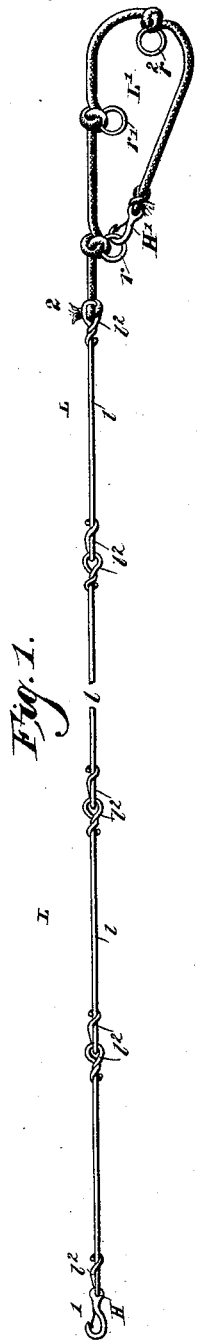
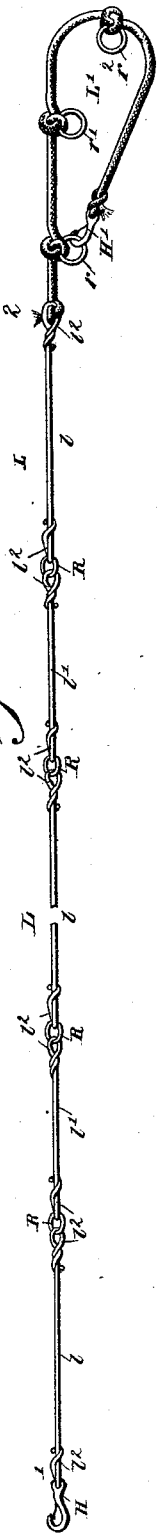
Witnesses
H. S. Dieterich
B. W. Sommers
Inventor.
Green H. Jordan.
By Henry Orth
Atty.

UNITED STATES PATENT OFFICE.

GREEN HENRY JORDAN, OF TALBOTTON, GEORGIA.

PLOW-LINE.

SPECIFICATION forming part of Letters Patent No. 475,570, dated May 24, 1892.

Application filed October 6, 1891. Serial No. 407,961. (No model.)

*To all whom it may concern:*

Be it known that I, GREEN HENRY JORDAN, a citizen of the United States, residing at Talbotton, in the county of Talbot and State of Georgia, have invented certain new and useful Improvements in Plow-Lines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention has for its object the construction of plow-lines from wire and the provision of means for attaching the line to the bridle and for adjusting the length according to the length of the animal hitched to the plow.

My invention comprises a plow-line composed of sections of wire linked together or sections of wire connected by flexible joints in combination with an arm or hand hold or loop and with means for attaching the line to a bridle. It also comprises a plow-line made of flexibly-connected wire sections of varying lengths, the longer sections alternating with the shorter sections, in combination with a hand or arm hold or loop and with means for attaching the line to a bridle; and it also comprehends a plow-line made of flexibly-connected wire sections, in combination with means for adjusting the lines as to length and with means for attaching the same to a bridle, as will now be fully described, reference being had to the accompanying drawings, in which—

Figure 1 is a view of a wire plow-line composed of wire sections of equal length and provided with an arm or hand hold or loop that is adjustable for the purpose of adjusting the length of the line. Fig. 2 is a view of a wire plow-line composed of wire sections of variable length alternately arranged, one or more of the shorter sections being detachable for the purpose of shortening the line; and Fig. 3 also shows a wire plow-line of alternating longer and shorter wire sections, the length of the line being adjusted by the adjustment of the arm or hand hold or loop.

Similar letters and figures indicate like parts wherever such may occur in the drawings.

The plow-line L may be constructed of any desired number of wire sections $l$ of a uniform length, said sections being provided with a loop or eye $l^2$ at each end for the purpose of looping them together, a snap-hook H being attached to eye or loop $l^2$ at the outer end of one of the end sections, as at 1, for attachment to the bridle, and to the eye or loop at the outer end of the other end section 2 is attached the arm-loop L', which is preferably made of a piece of rope or of a leather strap.

It is desirable for general use that the plow-line should be adjustable as to length and in a line constructed as described. This I accomplish by making the arm-loop adjustable, the rope or strap being provided with a snap-hook H', adapted to be hooked either to the loop or eye $l'$ of end section 2 or, for the purpose of lengthening the line, to one of the rings $r$, $r'$, or $r^2$, secured to said rope or strap L' at suitable distances along the same, as shown. The flexibility of the plow-line may, however, be greatly increased in various ways, and other means may be provided for adjusting the line as to length. For instance, instead of looping the wire sections directly to one another they may be looped to intermediate rings R, which greatly increases the flexibility of the line, and this may be further increased by constructing the line of wire sections $l$ of different lengths and so looping them together or to their connecting-rings R that the longer and shorter sections $l$ and $l'$ will alternate, as shown in Figs. 2 and 3. With a view to shortening or lengthening the line, two or more of the longer or shorter sections $l\,l'$, and preferably at the plow end of the line, may be provided at one or both ends with a snap-hook H', or otherwise constructed, so that one or more of said shorter sections may be readily detached from or attached to the longer sections or the connecting-rings R, the adjustable hand or arm loop L' being replaced by a single loop, as shown in Fig. 2. I prefer, however, to employ the adjustable hand or arm loop L' as being more convenient.

Practical use has demonstrated that a plow-line constructed as described is very much superior to the ordinary rope or leather lines, more easily handled, and more durable, while the cost of such a line does not exceed—in fact is less than—that of leather lines and is but little greater than that of the ordinary rope line.

A plow-line constructed as described has the further advantage of being more readily and more compactly folded than either a leather or rope line. There is also less friction between the line and slide ring or loop on trace near back-band hook or buckle.

Having thus described my invention, what I claim as new therein, and desire to secure by Letters Patent, is—

1. As an article of manufacture, a plow-line constructed of short sections of straight wires loosely articulated together and means for adjusting the same as to length, and provided with a snap-hook at one end and a hand or arm loop of a fibrous material at the other end, as set forth.

2. As an article of manufacture, a plow-line constructed of short sections of straight wires of like form and of different lengths, loosely articulated together, having a snap-hook at one end and a hand or arm loop at the other end of the line, as set forth.

3. As an article of manufacture, a plow-line constructed of short sections of straight wires loosely articulated together, provided with a snap-hook at one end and with an arm or hand loop at the other, and means for adjusting said loop to lengthen or shorten the same, substantially as and for the purpose set forth.

GREEN HENRY JORDAN.

Witnesses:
O. D. GORMAN,
RICHARD H. LEONARD.